United States Patent [19]

Eyraud et al.

[11] Patent Number: 5,073,435
[45] Date of Patent: Dec. 17, 1991

[54] COMPOSITE POLYESTER FILMS

[75] Inventors: Marcel Eyraud, Lyons; Pierre Grosjean, Sainte Foy Les Lyon, both of France

[73] Assignee: Rhone-Poulenc Chimie, Courbevoie, France

[21] Appl. No.: 137,160

[22] Filed: Dec. 23, 1987

[30] Foreign Application Priority Data

Dec. 23, 1986 [FR] France .................................. 86 18231

[51] Int. Cl.$^5$ .......................... B32B 7/02; B32B 27/36; B29C 47/88
[52] U.S. Cl. ................... 428/215; 156/244.24; 264/211.18; 264/211.2; 428/220; 428/480
[58] Field of Search ............... 428/480, 343, 336, 483, 428/215, 220, 195; 156/244.24; 264/211.18, 211.2

[56] References Cited

U.S. PATENT DOCUMENTS

| | | | |
|---|---|---|---|
| 4,476,189 | 10/1984 | Posey et al. | 428/336 |
| 4,525,419 | 6/1985 | Posey et al. | 428/480 X |
| 4,585,687 | 4/1986 | Posey et al. | 428/195 |
| 4,725,483 | 2/1988 | Ishii et al. | 428/220 |

FOREIGN PATENT DOCUMENTS

| | | | |
|---|---|---|---|
| 0188620 | 7/1986 | European Pat. Off. | 428/343 |
| WO84/02144 | 6/1984 | PCT Int'l Appl. | 428/343 |
| 1507876 | 4/1978 | United Kingdom | 428/480 |

*Primary Examiner*—Thomas J. Herbert, Jr.
*Attorney, Agent, or Firm*—Burns, Doane, Swecker & Mathis

[57] ABSTRACT

Composite polyester films, well adapted as either thick or thin film bases, e.g., for the graphic arts or for packaging, are comprised of a crystalline or semicrystalline polyester film substrate (A), said film substrate (A) having a coating, e.g., a coextrudate, of an oxysulfonylated copolyester adhesion primer on at least one of the face surfaces thereof, and said oxysulfonylated copolyester comprising admixture of (a) a crystalline or semicrystalline polyester, and (b) an oxysulfonylated copolyester wherein the number of oxysulfonylated recurring units, relative to 100 recurring units of like monomer, range from 3 to 20, and the respective amounts of the components (a) and (b) are such that the number of oxysulfonylated recurring units in the mixture relative to the total number of recurring units of like monomer, ranges from 2 to 15%.

23 Claims, No Drawings

COMPOSITE POLYESTER FILMS

CROSS-REFERENCE TO COMPANION APPLICATION

Copending application Serial No. 137,067 filed concurrently herewith and assigned to the assignee hereof.

BACKGROUND OF THE INVENTION

1. Field of the Invention

The present invention relates to novel oriented composite polyester films having improved adhesiveness towards a variety of final application coatings, to a process for the production thereof, and to the final application coated films fabricated therefrom By the term "final application coatings" as utilized herein, are intended coatings which impart certain properties to the oriented polyester films which permit extremely diverse industrial applications thereof, all well known to this art.

2. Description of the Prior Art

It is known to this art that for a number of industrial applications, polyester films cannot be used directly, but only after depositing thereon a coating adapted for each type of application; as examples, there may be mentioned matte coatings intended for manual drawing or for plotting tables; photosensitive coatings for photographic applications; diazo coatings for microfilm applications, printing of plans or reprography; coatings for printing; magnetic coatings for recording various signals (audio, video and computer signals); metal coatings; and coatings which modify the gas permeability of polyester films employed as packaging materials.

It is also known to this art that, by nature, the bonding of the final application coatings onto the surface of polyester films is not easy. In fact, polyester films have a relatively smooth surface, limited chemical reactivity, and a very low sensitivity to solvents. Therefore, it is most often necessary to first apply thereto an "adhesion primer" coating of more or less complex chemical formulae, which enables the application layers to be anchored. In general, this adhesion primer (or anchoring layer) is applied by the individual conducting the conversion. Therefore, it is easy to adapt the nature of the primer to the application ultimately made.

Film manufacturers have themselves sought to modify the surface of films by various means. The use of polymers of diverse nature as adhesion primers has been proposed for this purpose. A particularly advantageous class of polymers employed for this purpose consists of copolyesters having a plurality of recurring hydrophilic groups and especially hydroxysulfonyl groups, or their metal salts (free sulfonic acid groups or sulfonic acid salts will hereinafter be referred to by the term "oxysulfonyl group" for convenience). Adhesion primers of this type may be deposited either by coating the support film with a dispersion or an aqueous solution (cf. French Patents Nos. 1,401,581 and 1,602,002; U.S. Pat. No. 4,476,189 and European Patent No. 78/559), or by coextrusion or rolling (cf. Japanese Patent Applications published under Nos. 50/135,086 and 79/153,883). The deposition of an adhesion primer of the oxysulfonyl group-containing copolyester type by coating involves the use of copolyesters having high contents of oxysulfonyl group-containing recurring units to enable the sulfonated copolyester to be dispersed or dissolved in water. The coating process lacks flexibility because it restricts the range of sulfonated copolyesters which can be employed to those having a high content of oxysulfonyl group-containing recurring units. Moreover, depending on their composition, such sulfonated copolyesters may have low bonding temperatures which make the composite films difficult to handle or to use.

Coextrusion is a particularly advantageous process for applying an adhesion primer coating. However, it is not suitable for depositing a coating of highly modified sulfonated copolyesters onto a crystalline or semicrystalline polyester, either because of the high content of oxysulfonyl group-containing recurring units, or because of the presence of both such units and of recurring units derived from other comonomers employed to impart specific properties to sulfonated copolyesters (for example, isophthalic acid). Thus, it has been observed that sulfonated copolyesters of the ethylene glycol terephthalate/5-sulfoisophthalate type having a high content of 5-sulfoisophthalate units, for example greater than or equal to 10 mol %, do not lend themselves well to the production of composite films by coextrusion. Their use involves a lengthy and expensive drying step because of their hygroscopicity; insufficient drying interferes with the progress of the coextrusion process and results in poor quality films. Additionally, the rheological properties of sulfonated copolyesters are greatly modified by the presence of oxysulfonyl group-containing recurring units and are different from those of the polyester employed to produce the support film. This difference in rheological properties of the two polycondensates complicates the production of a composite film by coextrusion, or even makes it impossible. When the sulfonated copolyester contains recurring units other than sulfonated units, this gives rise to another disadvantage in addition to those mentioned above. Indeed, it has been observed in this case that beyond a certain content of sulfonated recurring units (in general, for contents greater than or equal to 5% relative to the units of the same nature), the composite film has relatively low bonding temperatures, usually less than 100° C. Sulfonated copolyesters having low bonding temperatures are not well adapted for production and/or conversion operations, such that it is usually difficult, if no impossible, to produce a film which can be used on an industrial scale. This is very particularly so when sulfonated copolyesters of the terephthalic acid/oxysulfonyl group-containing dicarboxylic acid-/isophthalic acid type derived from ethylene glycol are employed. Moreover, coextrusion entails having available a wide range of sulfonated copolyesters having a content of oxysulfonyl group-containing recurring units adapted for each type of application, which gives rise to storage and production constraints. The need to have available primer layers of varying degrees of roughness also necessitates the availability of sulfonated copolyesters having varied filler contents, which contributes to expanding the range of sulfonated copolyesters which can be employed for the production of adhesion primers by coextrusion.

In summary, the manufacturer of sulfonated copolyester-based adhesion primer coated film is confronted with the following alternatives: using the coating process for the copolyesters having a high content of oxysulfonyl group-containing recurring units or using the coextrusion process for copolyesters having a low content of oxysulfonyl group-containing recurring units in order to avoid the aforementioned disadvantages.

Consequently, serious need exists in the polyester film industry for means permitting a sulfonated copolyester-based adhesion primer to be applied to a crystalline, semicrystalline or crystallizable polyester film irrespective of the content of oxysulfonyl group-containing recurring units in such sulfonated copolyester, and, more particularly, permitting such coating to be applied by coextrusion in the case of copolyesters having a high content of oxysulfonyl group-containing recurring units, especially a content of such units greater than or equal to 5 mol % relative to the bifunctional units of like nature. The industry is also in need of means to limit the number of sulfonated copolyesters which must be available to the manufacturer for the production of coated films which differ in their adhesive properties and/or their topography.

SUMMARY OF THE INVENTION

Accordingly, a major object of this invention is the provision of improved composite polyester films having a sulfonated copolyester-based adhesion primer coating coextruded thereon, and the production of which is conspicuously devoid of the disadvantages and drawbacks to date characterizing the state of this art.

Another object of the present invention is the provision of novel composite polyester films having sulfonated copolyester-based adhesion primer coatings adapted to receive a wide variety of final application coatings.

Briefly, the present invention features the production of oriented composite polyester films having improved adhesiveness towards a variety of final application coatings, the same comprising a crystalline or semicrystalline polyester support film (A), bearing on at least one of its face surfaces a contiguous and coextensive layer of an oxysulfonyl group-containing copolyester-based adhesion primer coating (B), by coextruding said primer coating thereon, and said primer coating comprising a binary mixture of:

(a) a crystallizable polyester; and (b) a copolyester which comprises a plurality of oxysulfonyl groups in which the number of oxysulfonyl group-containing recurring units expressed relative to 100 recurring units of like nature ranges from 3 to 20, and the proportions of the components (a) and (b) in the mixture being such that the number of oxysulfonyl group-containing recurring units present in the mixture, expressed relative to the total number of recurring units of like nature, ranges from 2 to 15%.

This invention also features novel oriented composite polyester films having improved adhesiveness towards a variety of final application coatings, comprising a crystalline or semicrystalline polyester support film (A), bearing on at least one of its face surfaces a contiguous and coextensive layer of an oxysulfonyl group-containing copolyester-based adhesion primer coating (B), said layer (B) comprising a binary mixture containing:

(a) a crystalline or semicrystalline polyester; and (b) a copolyester containing a plurality of oxysulfonyl groups in which the number of oxysulfonyl group-containing recurring units expressed relative to 100 recurring units of like nature ranges from 3 to 20, and the proportions of the components (a) and (b) in the mixture being such that the number of oxysulfonyl group-containing recurring units present in the mixture, expressed relative to the total number of recurring units of the same nature, ranges from 2 to 15%.

DETAILED DESCRIPTION OF THE PREFERRED EMBODIMENTS OF THE INVENTION

More particularly according to the present invention, by the term "crystallizable polyester" are intended polyesters or copolyesters which, after extrusion in the molten state through a die, followed by the drawing of the amorphous polymer, yield crystalline or semicrystalline polyesters or copolyesters. The crystallinity of the polymer is determined by conventional means which are well known to this art, such as X-ray diffraction, differential thermal analysis [cf. S.H. LIN et al, *J. Polymer Sci. Polymer Symposium*, 71, 121–135 (1984)] and density test.

The crystallizable polyesters employed for the preparation of the support layer (A) and as constituent (a) of the binary mixture for the adhesion primer layer (B) are polyesters and copolyesters which are typically used for the production of oriented polyester films by drawing and which have a crystalline or semicrystalline structure after drawing.

For this purpose, it is possible to use any film-forming polyester produced from one or more carboxylic diacid(s) or their lower alkyl esters (terephthalic acid, isophthalic acid, 2,5-naphthalenedicarboxylic acid, 2,6-naphthalenedicarboxylic acid, 2,7-naphthalenedicarboxylic acid, succinic acid, sebacic acid, adipic acid, azelaic acid, diphenyldicarboxylic acid and hexahydroterephthalic acid) and one or more diols or polyhydric alcohols, such as ethylene glycol, 1,3-propanediol, 1,4-butanediol, neopentylglycol and 1,4-cyclohexanedimethanol, polyoxyalkylene glycols (polyoxyethylene glycol, polyoxypropylene glycol, or their random or block copolymers). When copolymers are employed, they must have a sufficient content of monomeric component(s) which impart crystallinity. Homopolyesters and copolyesters derived from terephthalic acid are preferably employed. In the case of copolyesters, the latter preferably have a terephthalate unit content representing at least 80 mol % of the diacid units and more preferably at least 90%. Polyesters an copolyesters derived from ethylene glycol and from 1,4-butanediol constitute a preferred class of polymers employed for the production of the support layer (A) and as component (a) of the binary mixture of the adhesion primer defining the layer (B). According to the invention, it is not essential that the crystallizable polymers employed for layer (A) and for layer (B) be identical. Advantageously, the polyester is an ethylene glycol polyterephthalate having an intrinsic viscosity, as determined at 25° C. in o-chlorophenol, of between 0.6 and 0.75 dl/g.

Representative of the oxysulfonyl group-containing copolyesters comprising component (b) of the binary mixture, copolyesters having a plurality of groups of the following general formula are employed:

$$(-SO_3)_n M \qquad (I)$$

in which:

D is equal to 1 or 2, and

M represents a hydrogen atom, an alkali metal (for example sodium or potassium), an alkaline earth metal (calcium or barium), an ammonium cation or a quaternary ammonium cation.

The oxysulfonyl group-containing copolyesters are known polymers. Such copolyesters are described in French Patents Nos. 1,401,581 and 1,602,002. These copolyesters may be produced by the polycondensation of one or more aromatic dicarboxylic acids with one or more aliphatic diols and at least one bifunctional comonomer containing at least one oxysulfonyl group. The oxysulfonyl group-containing bifunctional comonomers may be carboxylic diacids or diols, such as those described in French Patent No. 1,602,002 or U.S. Pat. No. 3,779,993. The oxysulfonyl groups are preferably linked to an aromatic radical.

Among these oxysulfonyl group-containing bifunctional comonomers aromatic acids of the following general formula are the more preferred:

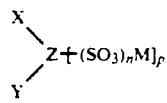 (II)

in which

M and D are as defined above;

Z is a polyvalent aromatic radical;

X and Y are hydroxycarbonyl radicals or derivatives thereof: lower aliphatic alcohol esters or acid halides (chloride or bromide); and p is an integer equal to 1 or 2.

In the formula (II), Z more preferably represents a phenyl radical or a combination of 2 or more than 2 ortho- or peri-fused phenyl radicals or of two or more phenyl groups linked to one another via inert groups such as alkylene (for example methylene, ethylene or propylene) or alkylidene (propylidene) radicals, or ether, ketone or sulfone groups.

As specific examples of the oxysulfonyl group-containing dicarboxylic acids, representative are hydroxysulfonylterephthalic acids; hydroxysulfonylisophthalic acids (especially 5-sulfoisophthalic acid); hydroxysulfonylorthophthalic acids; 4-hydroxysulfonyl-2,7-naphthalenedicarboxylic acid; hydroxysulfonyl-4,4'-biphenyldicarboxylic acid; hydroxysulfonyl-4,4'-(dihydroxycarbonyl)diphenyl sulfones; hydroxysulfonyl-4,4'-(dihydroxycarbonyl)diph-enylmethane; 5-(hydroxysulfonylphenoxy)isophthalic acid and 5-(hydroxysulfonylpropoxy)isophthalic acid. The sulfonated copolyesters derived from hydroxysulfonylisophthalic acids are very particularly well suited for the preparation of the composite films according to the invention.

The nonsulfonated dicarboxylic acids which can be used for the preparation of the oxysulfonyl group-containing copolyesters are those which are typically used for the production of polyesters. As examples of these, representative are terephthalic, isophthalic, phthalic, 2,5-naphthalenedicarboxylic and 2,6-naphthalenedicarboxylic acids; 4,4'-(dihydroxycarbonyl)diphenyl sulfone; 4,4'-(dihydroxycarbonyl)diphenyl ether; and alkanedioic acids containing from 4 to 16 carbon atoms, such as adipic, succinic and sebacic acids. These acids may be employed alone or in admixture with one another. Terephthalic and isophthalic acids, and more particularly mixtures of these two acids, are preferably employed.

When the oxysulfonyl group-containing copolyesters are comprised of units derived from alkanedicarboxylic acids, these units represent from 5 to 30 mole % of the total number of the nonsulfonated dicarboxylic acids. In this case, isophthalate units may also be present; however, it is preferable that the content thereof does not exceed 10 mole % of the total number of the nonsulfonated dicarboxylic acids.

The oxysulfonyl group-containing copolyesters which are very particularly well suited for carrying out the present invention are those which contain a number of terephthalate units representing at least 70% of the total number of the nonsulfonated diacid units, from 5 to 30% of $C_4-C_{16}$ aliphatic diacid units, from 0 to 10% of isophthalate units, from 3 to 20% of the total number of recurring units derived from carboxylic acids, sulfonic group-containing dicarboxylic acids and at most 10% by weight of diethylene glycol or its higher oligomers as defined above, relative to the copolymer.

Exemplary of the diols which can be used for the preparation of the oxysulfonyl group-containing polyesters, representative are ethylene glycol, propylene glycol, 1,3-butanediol, 1,4-butanediol, 2,2-dimethyl-1,3-propanediol, 1,5-pentanediol, 1,6-hexanediol, cyclohexanedimethanol, neopentylglycol, diethylene glycol and tri-, tetra-, penta and hexaethylene glycols. Ethylene glycol and its oligomers are very particularly well suited. They may be employed alone or in admixture with one another and/or with other diols. Mixtures of ethylene glycol and its oligomers having a molecular weight less than 600 are preferred. In the latter case, the ethylene glycol oligomer content, expressed as a percentage by weight of the sulfonated polyester, is preferably at least equal to 2% and at most equal to 30%. A proportion of from 5 to 25% by weight is preferred.

As mentioned above, the content of oxysulfonyl group-containing recurring units in the sulfonate copolyesters, expressed relative to the total number of recurring units of like nature (diacid or diol), ranges from 3 to 20% and preferably from 5 to 20%. Thus, when an oxysulfonyl group-containing dicarboxylic acid is employed, the number of recurring units derived from the latter constitutes from 3 to 20% of the total number of recurring units derived from the different dicarboxylic acids.

Among the oxysulfonyl group-containing copolyesters employed as component (b) of the primer (B), those containing in their chain a plurality of terephthalate units, 5-oxysulfonylisophthalate units and optionally isophthalate units, and a plurality of units derived form ethylene glycol and/or its oligomers, are preferably employed. Copolyesters in which the number of 5-oxysulfonylisophthalate recurring units represents from 3 to 20% of the total number of units derived from dicarboxylic acids are advantageously employed. When the copolyesters contain both terephthalate and isophthalate units, the latter preferably represent at most 70% of the total terephthalate/isophthalate units. A number of isophthalate units of from 5 to 60% of this total is well suited.

The sulfonated copolyesters described above may be prepared by conventional known processes. Thus, it is possible to react, in a first stage, the diol or the diols with a methyl ester of the carboxylic acid or acids, one or the other group of reagents containing the oxysulfonyl group-containing bifunctional comonomer, to form, by transesterification, in the presence of the usual catalysts, the corresponding diol esters and then, in a second stage, to conduct a polycondensation in known manner. According to another method, it is possible to prepare two prepolycondensates, one of which contains the oxysulfonyl group-containing recurring units, and to react them in the presence of common catalysts until a higher molecular weight copolyester is produced. The oxysulfonyl group-containing copolyester may be a block copolyester or a random copolyester.

The process according to the invention is very particularly well suited for using sulfonated copolyesters containing at least 5 mol % of recurring units containing oxysulfonyl groups and especially oxysulfonylisophthalic groups, relative to the nonsulfonated recurring units of like nature. It is very particularly well suited for using such sulfonated copolyesters which also contain a plurality of terephthalate and isophthalate recurring units, in which the isophthalate units represent up to 70% of the total number of the terephthalate/isophthalate units.

The proportions by weight of the components (a) and (b) in the binary mixture constituting the primer (B) may vary over wide limits depending on the content of oxysulfonyl group-containing recurring units in the sulfonated copolyester. These proportions are calcualted such that the number of oxysulfonyl group-containing recurring units, expressed relative to the total number of recurring units of like nature (diacid or diol) present in the final mixture, range from 2 ot 15% and preferably from 3 to 10%. Under these conditions, the content by weight of component (b) in the mixture may range from 20 to 80% by weight depending on the content of oxysulfonyl group-containing recurring units in (b). Binary mixtures are preferably used containing from 40 to 60% by weight of crystallizable or semicrystallizable polyester (a) and from 60 to 40% by weight of sulfonated copolyester (b) having a content of oxysulfonyl group-containing recurring units ranging from 3 to 20% of the total number of the units of like nature, such that the content of these same units in the mixture remains within the range of from 2 to 15% of the total number of the units of like nature present in the mixture and preferably within the range of from 3 to 10%.

Also according to the present invention, a component (a) can be used which is a mixture of at least two crystallizable polyesters and a component (b) which is a mixture of at least two oxysulfonyl group-containing copolyesters which differ from one another in the nature of their recurring units and/or their content of oxysulfonyl group-containing recurring units.

The layers (A) and/or (B) of the composite films of the invention may contain fine particles to modify the surface roughness of the layer containing them, by imparting good slip properties thereto.

The fillers present may be fine particles introduced into the polymeric composition and/or particles originating from catalytic residues or from precipitation adjuvants. The roughness is preferably imparted by introducing fine inert particles into the polymeric composition.

The amounts of particles present are such that the particle content of the entire layer is from 0.05 to 1% and preferably from 0.02 to 0.5% by weight. With regard to the volume-median diameter of these particles, this typically ranges from 0.1 to 5 microns and preferably from 0.2 to 3 microns.

The nature of the inert particles added may be very diverse; these may be inorganic particles (oxides or salts of the elements of Groups II, III and IV of the Periodic Table), or alternatively, polymeric particles. Among such fillers, representative are silica, silicoaluminates, calcium carbonate, MgO, $Al_2O_3$, $BaSO_4$ and $TiO_2$. A mixture of several fillers may obviously be employed.

When layer (B) contains particles in the finely divided state, these may be introduced via any one or several of the polyesters constituting the mixture. However, it is preferable in practice, and this is an added advantage of the present invention, that the fillers are introduced via the crystalline or crystallizable polyester. In fact, it suffices to vary the quantity of component (a) charged in the mixture and/or the filler content of (a) in order to produce layers (B) having varied topographies, without having to charge a wide range of components (b).

In one embodiment of the present invention, the layers (A) and/or (B) may additionally contain various additives which are commonly employed in the film industry, such as, for example, heat stabilizers which enable the film to be recycled.

The composite films according to the present invention may contain a single layer (B) or two layers (B) (a layer B on each face surface of the support layer A). In this case, the layers (B) may be identical or different. The layers (B) may then differ from each other in the nature of the polyesters (a) and (b) constituting the binary mixture and/or in the proportions of (a) and (b) in the mixture, and/or the presence or absence of fillers, and/or by the filler content and/or also by their thickness.

The crystalline, semicrystalline or crystallizable polyester (a) employed as a component of the binary mixture may be identical to or different from the crystalline, semicrystalline or crystallizable polyester constituting layer (A). This difference may be in the nature of the polyester and/or in the presence of a filler in one or the other of the polyesters and/or in the filler content of each of the polyesters and/or in the particle size of the fillers and/or in the nature of the fillers. Thus, by way of example, the polyester constituting the layer (A) may be an ethylene glycol polyterephthalate and the component (a) of the binary mixture may be a crystalline or crystallizable ethylene glycol terephthalate/isophthalate copolyester containing less than 20 mol % of isophthalate units, or, alternatively, the polyester constituting layer (A) is an ethylene glycol polyterephthalate without any filler and the component (a) of the binary mixture is the same polyester containing a filler.

When the composite films according to the invention have only a single layer (B), the other face surface of layer (A) may bear a layer (C) other than layers (A) and (B). The layer (C) may differ from layer (A) in the nature of the polyester comprising same and/or in the presence of fillers in one layer or the other and/or in the nature and/or the particle size and/or the content of these fillers. A convenient means is thus provided for modifying the surface properties (topography) of the face surface of the composite film according to the invention opposite to that onto which the layer (B) is coated. The roughness, the coefficient of friction and the scratch resistance may then be varied depending on the intended final use of the films.

The use of binary mixtures for the production of the composite films of the present invention is very particularly well suited to coextrusion. Such films are thus produced by feeding, into a first linear die, a polyester which provides amorphous films which become crystalline or semicrystalline after being subjected to a drawing treatment followed by a thermosetting treatment, whereas the binary mixture is simultaneously extruded by at least one second die arranged parallel to the first and in the immediate vicinity thereof.

The latter may be formulated by any known technique for mixing and homogenizing in a single stage or in several stages. It may be prepared directly before its extrusion, by melting its components at high temperature, or may be prepared beforehand, extruded and packaged in the form of granules and remelted, optionally after dilution with crystalline, semicrystalline or crystallizable polyester granules.

The conditions for the preparation and extrusion of the binary mixture are selected such as not to cause a change in this mixture towards the formation of block polymers or even random polymers, and such that the properties specific to each component of the mixture would be profoundly modified or extinguished (for example crystallinity). In particular, the residence time of the mixture in the extruder, which provides for the mixing of the components and the extrusion, is maintained sufficiently short so as not to cause any profound modification of the polymers.

The conditions for drawing the extruded composite film are those typically employed in the manufacture of polyester films. Thus, it is possible to conduct a monoaxial drawing, or a biaxial drawing carried out in sequence or simultaneously in two directions, generally orthogonal, or, alternatively, sequences of at least 3 drawings in which the drawing direction is changed in each sequence. Moreover, each unidirectional drawing itself may be carried out in several stages. Thus, it will be possible to combine drawing sequences such as, for example, two successive biaxial drawing treatments, it being possible for each drawing to be carried out in several stages.

The composite film is preferably subjected to a biaxial drawing in two perpendicular directions. For example, it is possible to first perform a drawing in the direction of movement of the film (longitudinal drawing) and then a drawing along a perpendicular direction (transverse drawing), or vice versa. The longitudinal drawing is generally carried out to an extent of from 3 to 5 (i.e., the length of drawn film represents from 3 to 5 times the length of the amorphous film) and at a temperature from 80° to 100° C. and the transverse drawing is carried out to an extent of from 3 to 5 and at a temperature from 90° to 120° C.

The drawing may also be carried out simultaneously, i.e., simultaneously in the longitudinal and in the transverse direction, for example to an extent of from 3 to 5 and at a temperature from 80° to 100° C.

Depending on the choice of drawing conditions, it is possible to produce specific surface topographies such as the presence of cavities surrounding a protuberance. This possibility of producing specific topographies additionally depends on the choice of the polymer and its adjuvants.

The composite films of the invention may be the so-called thin films having an overall thickness of from 5 to 40 micrometers, or the so-called thick films having a thickness usually greater than 40 and less than 300 micrometers. In these composite films, the layer (B) or the layers (B) have a thickness which is usually from 0.3 micrometers to 10 micrometers and preferably from 0.5 micrometer to 5 micrometers.

The process according to the invention is very particularly well suited for improving the adhesiveness of the so-called thick polyester films (having a thickness greater than 40 micrometers) to varied final application coatings; in fact, it has been observed that improving the adhesiveness of thick films to their final application coatings entails the use of sulfonated copolyesters having a higher content of oxysulfonyl group-containing recurring units than in the case of applying the thin films, and especially using contents greater than 3% and preferably greater than or equal to 5%. In this case, the process according to the invention enables good film producing conditions to be attained, while achieving good adhesive properties at the same time.

Considering their anchoring properties, the composite films of the present invention may advantageously be employed in many fields such as to form, after coating, films for the graphic arts (matte coating), diazo films for microfilm, films for magnetic tapes, photographic films (silver-coated films), or films for printing and/or complexing, intended for packaging.

The present invention also features composite polyester films having a final application coating deposited onto layer (B).

More specifically, the present invention also features complex composite films comprising a crystalline or semicrystalline oriented polyester support film (A) bearing, on at least one of its face surfaces, a final application coating deposited onto a layer (B) comprised of the oxysulfonyl group-containing copolyester-based adhesion primer coating, such layer (B) comprising the binary mixture:

(a) a crystalline or semicrystalline polyester; and (b) a copolyester containing a plurality of oxysulfonyl groups in which the number of oxysulfonyl group-containing recurring units, expressed relative to 100 recurring units of like nature, ranges from 3 to 20, and the proportions of components (a) and (b) in the mixture being such that the number of oxysulfonyl group-containing recurring units present in the mixture, expressed relative to the total number of recurring units of like nature, ranges from 2 to 15%.

In the composite polyester films bearing final application coatings according to this invention, the final coating is more particularly a magnetic coating (layer of metal oxides or metal deposited by evaporation), a metal coating (for example aluminum), a printing layer based on special inks for polyester or on cellulose inks, a polyethylene coating which may or may not be deposited on a printing layer, a matte coating for the graphic arts or a diazo coating for microfilm reproduction.

The present invention is very particularly well suited for the production of complex films comprising a crystalline or semicrystalline polyester support film (A) and a polyethylene film optionally covering a printing layer. It is known that it is advantageous to place a polyethylene film on polyester films intended for packaging, in order to provide them with heat sealing and gas impermeability properties, or to protect the printing layer. The polyethylene film is bonded to the support film and, where appropriate, to the printing layer using adhesives which are well known to this art. It has been observed that the binary mixtures according to the invention improve th bonding between the polyester support film and the polyethylene film. The use of the composite films according to the invention proves particularly advantageous for the production of complex packaging films containing both a printing layer and a polyethylene film, because the sulfonated copolyester-based binary mixture improves the adhesiveness of both the printing layer and the polyethylene film to the support film.

This invention also has the advantage of enabling the roughness of the layer(s) (B) to be adjusted at will by the choice of the content, the nature and the particle size of the fillers incorporated into the polyester (a) and by the choice of the proportion of the polyester (a) in the binary mixture.

Moreover, considering the composition of the binary mixture (significant presence of crystalline polyester) and the thicknesses of layers (A) and (B), respectively, it is possible to recycle up to 30% of the mixtures obtained by melting the wastes from the composite films with the polyester forming layer (A) without adversely affecting the quality of the film.

In order to further illustrate the present invention and the advantages thereof, the following specific examples are given, it being understood that same are intended only as illustrative and in nowise limitative.

In said examples to follow, the crystalline or crystallizable polyesters are referred to as (a) and the sulfonated copolyesters as (b).

Also in said examples to follow, the tests below are carried out.

(1) Test of bonding of the film to itself

The bonding temperature of the film is determined using an apparatus bearing the trademark THERMOTEST— RHODIACETA. This apparatus is fitted with a series of studs, each heated to a constant temperature within a range of from 70° to 250° C. In order to determine the bonding temperature of a film, the latter is placed flat against the studs of the apparatus for 1 min at a pressure of 4kPa±1kPa and the temperature of the stud on which the bonding of the film to itself occurs is noted (cf. Standard NF G 07-063 of December 1979).

(2) Adhesiveness tests

For this purpose, each composite film is coated manually on layer (B) with a final coating using an apparatus bearing the trademark HAND COATER, the engraved coating rod of which is selected such as to deposit 6 g of composition per m² of film. The coated film is dried in a fan-assisted oven for 1 minute at 150° C. and stored for 24 hours before being subjected to the following adhesiveness tests.

Peeling tests for the coating are carried out on each of the coated films using an adhesive tape marketed under the trademark MAGIC TAPE No. 810 by MINNESOTA MINING MANUFACTURING. The tape is applied manually and the peeling is carried out under conditions of increasing severity:

(a) slow peeling;
(b) quick peeling;
(c) peeling with prior scarring of the final coating using a razor blade;
(d) peeling with prior creasing of the film.

In each case, the resistance to peeling is rated from 1 (easy complete peeling) to 10 (perfect retention of the coating). Finally, an overall rating from 1 to 10 which takes into account the ratings given for each of the conditions (a) to (d) gives a general evaluation of the resistance to peeling of the final coatings in each of the tests.

The following tests were employed:

TEST B

A matte coating for the graphic arts, based on polyvinyl alcohol crosslinked in the heated state, in a water-/alcohol solvent, is applied to the composite film.

TEST 10

A diazo matte coating based on uncrosslinked cellulose acetopropionate dissolved in alcohol is applied.

TEST 3

A diazo coating for microfilm reproduction, in a ketone medium, is applied to the composite film.

(3) Tests of suitability for printing

Different types of inks are applied to the composite film using an engraved cylinder press as described above. The inked films are then dried for 2 min at 120° C. and subjected to the peeling tests described above.

TEST 1

An ink marketed under the trademark TERPLEX by SICPA is applied to the layer(s) B of the composite film.

TEST 2

An ink for flexogravure marketed under the trademark POLYPLEX by INMONT SA is applied.

TEST 3

A nitrocellulose ink for photogravure and flexogravure marketed under the trademark CTSW by LORILLEUX is applied.

(4) Complexing tests

A 60 micrometer thick polyethylene film is applied onto the layer (or layers) B of a composite film on an industrial machine from 400 mm wide rolls. The bonding of the composite polyester film and the polyethylene film is achieved using various adhesives. The delamination strengths are then determined using 15 mm wide specimens in the transverse (T) direction and in the longitudinal (L) direction. The following adhesives are employed:

TEST 1

The adhesive marketed under the trademark ADCOTE 550 by MORTON.

TEST 2

The adhesive marketed under the trademark LIAFOL 5000 by HENKEL.

In the examples below, the following polyesters and copolyesters were employed:

(1) Crystallizable polyesters (a)

Reference (a1)

This is a ethylene glycol polyterephthalate containing 3.8 mol % of diethylene glycol and having a viscosity index of 740, as determined at 25° C. in orthochlorophenol.

Reference (a2)

This is the PET (a1) containing 0.35% by weight of calcium carbonate particles having a volume-median diameter equal to 0.9 micrometer.

Reference (a3)

This is the PET (a1) containing 1% by weight of silica particles of trademark SYLOID 3153 of volume-median diameter equal to 1.48 micrometers.

Reference (a4)

This is the PET (a1) containing 0.35% by weight of kaolinite having a volume-median diameter equal to 1.3 micrometers.

(2) Sulfonated polyesters (b)

Reference (b1)

This copolyester was prepared as follows:

According to known technique, a prepolycondensate was first prepared by the reaction between isophthalic acid, 5-sulfoisophthalic acid and ethylene glycol in the presence of sodium acetate which is employed as the catalyst; the esterification was carried out at atmospheric pressure up to 220° C, followed by prepolymerization up to 240° C.

Another prepolycondensate was also prepared frrm dimethyl terephthalate and ethylene glycol in the presence of manganese acetate; the interchange was carried out at atmospheric pressure up to 225° C. After adding a phosphorus-containing stabilizer and antimony trioxide, this prepolycondensate was mixed with the prepolycondensate described in the preceding paragraph. The mixture was heated to 275°, the pressure being gradually reduced to 0.5 torr.

The copolyester obtained was then cast and granulated. It had the following characteristics:

isophthalic acid content in the terephthalic acid (TA)/isophthalic acid (IA) mixture in mol %: 60; 5-sulfoisophthalic acid (SIA) content in moles per 100 moles of non-sulfonated aromatic diacids (TA/IA): 16.2;

diethylene glycol (DEG) content by weight: 15%.

Reference (b2) to (b7)

Operating as above, various sulfonated copolyesters having recurring units TA/IA/SIA/ethylene glycol/ethylene glycol oligomers, having the following characteristics were prepared:

| Reference for sulfonated copolyester | TA mol % | IA mol % | SIA mol % | DEG % by weight |
|---|---|---|---|---|
| b2 | 40 | 60 | 14 | 14 |
| b3 | 80 | 20 | 14 | 14 |
| b4 | 100 | 0 | 14 | 14 |
| b5 | 90 | 10 | 7 | 4.1 |
| b6 | 70 | 30 | 7 | 12 |
| b7 | 95 | 5 | 7 | 2.9 |

The composite films were prepared by coextruding a polyester film (a) and the mixture a/b. The main extrusion line for layer (A) operated at 275° C. and the satellite extrusion line for layer (B) at a temperature below 275° C.

The polyester mixtures a/b were obtained as follows: the polyesters employed as a component of layer (A) and as a component (a) of the ternary mixture were dried at 160° C. in order to remove any trace of moisture. The copolyesters were oven-dried under moisture-free air. Two components, in the particulate form, were stored and charged in selected proportions under an inert gas atmosphere, into the screw-type extruder of the satellite extrusion line.

It will be appreciated that in the examples below, the contents of recurring units derived from terephthalic and isophthalic acids in the mixtures M of the polyester (a) and the sulfonated copolyester (b), expressed in mol %, are calculated on the basis of the total number of the recurring units TA and IA present in the mixture M; the content of recurring units derived from 5-sulfoisophthalic acid (SIA), expressed in mol %, is calculated on the basis of the total number of the recurring units TA, IA and SIA present in the mixture M; the total DEG content by weight is calculated on the basis of 100 parts by weight of the mixture.

EXAMPLE 1

A biaxially drawn composite film F1 containing three layers B/A/B was prepared by coextruding, on the one hand, the polyterephthalate (a1) described above and, on the other hand, a mixture M1 containing 50% by weight of PET (a1) and 50% by weight of the sulfonated copolyester (b1). The layers (B) situated on either side of layer (A) were identical and had a thickness of 1.5 micrometer. The total thickness of the film was 50 micrometers. The mixture M1 forming the layers B had the following composition:

| SIA content mol %: | 8 |
|---|---|
| DEG content % by weight: | 7 |
| TA content mol %: | 70 |
| IA content mol %: | 30 |

The composite film F1 was obtained without any difficulty and had a normal surface appearance. It was subjected to the following tests:

(1) Bonding test

The film F1 had a bonding temperature of 130° C. in the test described above.

(2) Adhesiveness tests

| Test 8: | Overall rating: | 9 |
|---|---|---|
| Test 10: | Overall rating: | 7 |

By way of comparison, attempts were made to prepare a composite film similar to film F1 but by replacing the mixture M1 by the sulfonated copolymer (b1). Because of the low bonding temperature (80° C.) of (b1), it was difficult to obtain a composite film in an industrially acceptable marner.

EXAMPLE 2

Following the procedure of Example 1, a composite film F2 was prepared containing 3 layers B/A/B, and having a total thickness of 50 micrometers; layers (B) had a thickness of 1.5 micrometers. Layer (A) consisted of PET (a1) and the layers (B) consisted of a 50:50% by weight mixture M2 of (a1) and of sulfonated copolyester (b2). The mixture M2 had the following characteristics:

| SIA content mol %: | 7 |
|---|---|
| TA content mol %: | 70 |
| IA content mol %: | 30 |
| DEG content % by weight: | 7 |

The film F2 was obtained without any difficulty and had a normal surface appearance and a good bonding of the layers (B) with layer (A).

The film F2 was subjected to the following tests:
F2 had a bonding temperature of 100° C.

(b) Adhesiveness test

| Test 3: | overall rating: | 10 |
|---|---|---|
| Test 8: | overall rating: | 10 |

| -continued | | |
|---|---|---|
| Test 10 | overall rating | 7 |

By way of comparison, attempts were made to prepare a composite film F'2 by replacing the mixture M2 by the pure sulfonated copolyester (b2). The film F'2 could not be obtained.

EXAMPLE 3

Following the procedure of Example 1, a 50 micrometer thick composite film F3 was prepared after replacing the mixture M1 by a mixture M3 containing 50% by weight of PET (a1) and 50% by weight of sulfonated copolyester (b3). M3 had the following characteristics:

| SIA content mol % | 7 |
|---|---|
| DEG content % by weight | 7 |
| TA content mol % | 90 |
| IA content mol % | 10 |

The film F3 was obtained without any difficulty and had a normal surface appearance. It was subjected to the following tests:

(a) Bonding test: 120° C.

(b) Adhesiveness tests

| Test 3 | overall rating | 10 |
|---|---|---|
| Test 8 | overall rating | 10 |
| Test 10 | overall rating | 9 |

Comparative tests CT1 and CT2

By way of comparison, two composite films F'3 and F''3 were prepared after replacing the mixture M3 by the sulfonated copolyester (b3) and by the sulfonated copolyester (b5) respectively. The films F'3 and F''3 were subjected to all or some of the tests applied to F3. The following results were obtained:

| Comparative test | CT1 | CT2 |
|---|---|---|
| Films | F'3 | F''3 |
| Bonding test °C. | 70 | 100 |
| Adhesiveness test | | |
| T8 | 8 | 10 |
| T10 | 10 | 3 |

A comparison of the test results for F3 and F'3 showed that the addition of (a1) to (b3) resulted in a significant increase in bonding temperature without any loss of adhesive properties.

A comparison of the test results for F3 and F''3 revealed that the substitution of a pure sulfonated copolyester by a crystallizable polyester/sulfonated copolyester mixture having a TA, IA and SIA content identical to that of the pure sulfonated copolyester resulted in an increase in bonding temperature and an improvement in adhesiveness according to test 10.

EXAMPLE 4

Following the procedure of Example 1, a composite film F4, having a total thickness of 40 micrometers, was prepared after replacing the mixture M1 by a mixture M4 containing 50% by weight of PET (a1) and 50% by weight of sulfonated copolymer (b4). The mixture M4 had the following composition:

| SIA content mol % | 7 |
|---|---|
| DEG content % by weight | 7 |
| TA content mol % | 100 |
| IA content mol % | 0 |

The film F4 was obtained without any difficulty and had a normal surface appearance. It was subjected to the following tests:

(a) Bonding test: 160° C.

(b) Adhesiveness tests:

| Test 3 | overall rating | 10 |
|---|---|---|
| Test 8 | overall rating | 7 |
| Test 10 | overall rating | 10 |

By way of comparison, attempts were made, without success, to prepared a composite film by coextruding PET (a1) and the pure copolyester (b4).

EXAMPLE 5

Following the procedure of Example 1, a 50 micrometer thick composite film F5 was prepared by coextruding PET (a1) and a mixture M5 consisting of 50% by weight of PET (a1) and 50% by weight of sulfonated copolyester (b6). The mixture M5 had the following composition:

| SIA content mol % | 3.5 |
|---|---|
| DEG content % by weight | 6 |
| TA content mol % | 85 |
| IA content mol % | 15 |

The film F5 thus obtained had a good surface ppearance. It was subjected to the following tests:

(a) Bonding test: 140° C.

(b) Adhesiveness tests

| Test 3 | overall rating | 9 |
|---|---|---|
| Test 8 | overall rating | 9 |
| Test 10 | overall rating | 8 |

It was not possible to obtain a PET (a1)/pure sulfonated copolyester (b6) composite because of the sticky nature of the film in the amorphous state.

By way of comparison, two composite films F'5 and F''5, having a thickness of 50 mm, were prepared by coextruding PET (a1) and 25% by weight of (b6) and M''5 containing 25% by weight of (a1) and 75% by weight of (b6). M'5 and M''5 had the following characteristics:

| | M'5 | M''5 |
|---|---|---|
| SIA content mol % | 2 | 5.25 |
| DEG content by weight | 3 | 9 |
| TA content mol % | 92.5 | 77.5 |
| IA content mol % | 7.5 | 22.5 |
| bonding temperature | 160 | 90 | adhesiveness

|        |   |    |
|--------|---|----|
| Test 3 | 1 | 8  |
| Test 8 | 2 | 10 |
| Test 10| 7 | 10 |

Comparing film M'5 with film M5, it was observed that the addition of too large a quantity of (a1) to (b6) resulted in a significant lowering of the adhesive properties, whereas the addition of too small a quantity of (a1) to (b6), although it enabled a good adhesiveness to be maintained, did not enable the bonding temperature of the composite film M"5 to be increased sufficiently.

EXAMPLE 6

Following the procedure of Example 1, a 50 micrometer thick composite film F6 was prepared by coextruding:
(a) PET (a1); and
(b) a mixture M6 containing 50% by weight of (a2) and 50% by weight of (b7). The mixture M6 had the following characteristics:

| SIA content mol %:      | 3.5  |
| DEG content % by weight.| 1.5  |
| TA content mol %:       | 97.5 |
| IA content mol %:       | 2.5  |

The composite film F6 was obtained without any difficulty. It was subjected to the adhesiveness tests 8 and 10 in which overall ratings of 8 and 10 respectively were obtained.

EXAMPLE 7

A composite film F7 was prepared by the procedure of Example 6, but after replacing the PET (a2) in mixture M6 by the filler-containing PET (a3), all other parameters being equal.

A 50 micrometer thick composite film containing a filler-free layer A and two filler-containing outer layers B, 2.5 micrometers in thickness, was obtained without any difficulty. When subjected to adhesiveness tests 1 and 2, film F7 received overall ratings of 7 and 9.

EXAMPLE 8

A 50 micrometer thick composite film F8 was prepared by coextruding the PET (a1) in Example 6 and a mixture M8 containing 50% by weight of PET (a2) and 50% by weight of the sulfonated copolyester (b5). The mixture M8 had the following characteristics:

| SIA content mol %:       | 3.5 |
| DEG content % by weight: | 2   |
| TA content mol %:        | 95  |
| IA content mol %:        | 5   |

The film, which was obtained without any difficulty, had the following overall ratings in adhesiveness tests 1 and and 2: 8 and 9.

EXAMPLE 9

A 50 micrometer thick composite film F9, containing three layers B/A/B, was prepared by coextruding:
(a) the PET (a1) in Example 1; and
(b) a mixture M9 containing 50% by weight of the PET (a3) in Example 7 and 50% by volume of the sulfonated copolyester (b3).

The film F9, which was obtained without any difficulty, had a bonding temperature higher than 140° C. and overall ratings of 9 in adhesiveness tests 8 and 9.

EXAMPLE 10

A 12 micrometer thick composite film F10, containing a 1 micrometer thick outer layer B and a layer A, was prepared by coextruding PET (a4) and a mixture M10 containing 75% by weight of PET (a1) an 25% by weight of sulfonated copolyester (b1). The mixture had the following characteristics:

| SIA content mol %:       | 4.05 |
| DEG content % by weight: | 3.75 |
| TA content mol %:        | 85   |
| IA content mol %:        | 15   |

The film F10 was obtained without any difficulty. It was subjected to the following tests:

(1) Bonding test: 135° C.

(2) Tests of suitability for printing

| Test 1: | overall rating: | 10 |
| Test 2: | overall rating: | 10 |
| Test 3: | overall rating: | 10 |

(3) Complexing tests

Delamination strength in g

|        | L   | T   |
|--------|-----|-----|
| Test 1 | 330 | 320 |
| Test 2 | 330 | 300 |
| Test 3 | 380 | 360 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A coextruded composite polyester film comprising a crystalline or semicrystalline polyester film substrate (A), said film substrate (A) having a coating (B) of an oxysulfonylated copolyester adhesion primer on at least one of the face surfaces thereof, and said oxysulfonylated copolyester comprising admixture of (a) a crystalline or semicrystalline polyester, and (b) an oxysulfonylated copolyester wherein the number of oxysulfonylated recurring units, relative to 100 recurring units of like monomer, ranges from 3 to 20, and the respective amounts of the components (a) and (b) are such that the number of oxysulfonylated recurring units in the mixture relative to the total number of recurring units of like monomer, ranges from 2 to 15%.

2. The composite polyeste film as defined by claim 1, having a total thickness of from 5 to 300 micrometers and wherein the thickness of said coating(s) (B) ranges from 0.3 to 10 micrometers.

3. The composite polyester film as defined by claim 1, wherein the copolyester comprising said component (b) has a plurality of recurring oxysulfonyl groups of the general formula:

$$(-SO_2)_n M \qquad (I)$$

in which n is equal to 1 or 2; and M is a hydrogen atom, an alkali metal, an alkaline earth metal, an ammonium cation or a quaternary ammonium cation.

4. The composite polyester film as defined by claim 1, said admixture comprising from 20 to 80% by weight of the sulfonated copolyester (b) and from 80 to 20% by weight of the polyester (a).

5. The composite polyester film as defined by claim 1, the film substrate (A) having a coating (B) on each face surface thereof.

6. The composite polyester film as defined by claim 1, at least one of the film substrate (A) and coating(s) (B) comprising an effective amount of filler particles.

7. The composite polyester film as defined by claim 1, wherein the polyester comprising said substrate (A) and the component (a) is a homopolyester or a copolyester of terephthalic acid containing at least 80 mol % of terephthalate recurring units.

8. The composite polyester film as defined by claim 7, wherein the polyester comprising said substrate (A) and the component (a) is ethylene glycol polyterephthalate.

9. The composite polyester film as defined by claim 1, wherein the sulfonated copolyester comprising said component (b) has a plurality of aromatic diacid recurring units of the formula:

$$\begin{array}{c} X \\ \diagdown \\ Z + (SO_3)_n M]_p \\ \diagup \\ Y \end{array} \qquad (II)$$

in which n is equal to 1 or 2; M is a hydrogen atom, an alkali metal, an alkaline earth metal, an ammonium cation or a quaternary ammonium cation; Z is a polyvalent aromatic radical; X and Y are hydroxycarbonyl radicals or derivatives thereof; and p is an integer equal to 1 or 2.

10. The composite polyester film as defined by claim 4, wherein the sulfonated copolyester (b) comprises a plurality of recurring units derived from a hydroxysulfonylisophthalic acid.

11. The composite polyester film as defined by claim 10, wherein the sulfonated copolyester (b) further comprises a plurality of recurring units derived from terephthalic acid.

12. The composite polyester film as defined by claim 11, wherein the sulfonated copolyester (b) comprises a plurality of recurring units derived from terephthalic acid and a plurality of recurring units derived from isophthalic acid.

13. The composite polyester film as defined by claim 12, wherein the sulfonated copolyester (b), the number of recurring units derived from isophthalic acid constitutes up to 70% of the total number of terephthalate/isophthalate recurring units.

14. The composite polyester film as defined by claim 9, wherein the sulfonated copolyester (b) comprises a plurality of recurring units derived from ethylene glycol and/or the oligomers thereof having a molecular weight of less than 600.

15. The composite polyester film as defined by Claim 14, wherein the content by weight of the recurring units derived from ethylene glycol oligomers in the sulfonated copolyester ranges from 2 to 30%.

16. The composite polyester film as defined by claim 1, comprising a final application coating on the at least one primer coating (B).

17. The composite polyester film as defined by claim 16, said final application coating comprising a graphic arts layer.

18. The composite polyester film as defined by claim 16, said final application coating comprising a polyethylene film.

19. The composite polyester film as defined by claim 18, further comprising a printing layer between said polyethylene layer and primer coating (B).

20. A packaging material comprising the composite polyester film as defined by claim 19.

21. A coextruded composite polyester film having a total thickness greater than 40 micrometers, said coextruded composite polyester film comprising a crystalline or semi-crystalline polyester film substrate (A), said film substrate (A) having a coating (B) of an oxysulfonylated copolyester adhesion primer on at least one of the face surfaces thereof, and said oxysulfonylated copolyester comprising an admixture of (a) a crystalline or semicrystalline polyester, and (b) an oxysulfonylated copolyester wherein the number of oxysulfonylated recurring units, relative to 100 recurring units of like monomer, ranges from 3 to 20, and the respective amounts of the components (a) and (b) are such that the number of oxysulfonylated recurring units in the mixture relative to the total number of recurring units of like monomer, ranges from 2 to 15%.

22. A process for the preparation of the composite film as defined by claim 1, comprising (i) coextruding a crystallizable polyester film (A) with said coating (B), wherein component (a) comprises a crystallizable polyester, and then (ii) orienting and thermosetting such coextrudate.

23. The product of the process as defined by claim 22.

* * * * *